Sept. 18, 1951  J. M. VANDERLECK  2,568,100
VIBRATING REED TYPE DIRECT CURRENT MOTOR
Filed Aug. 20, 1949
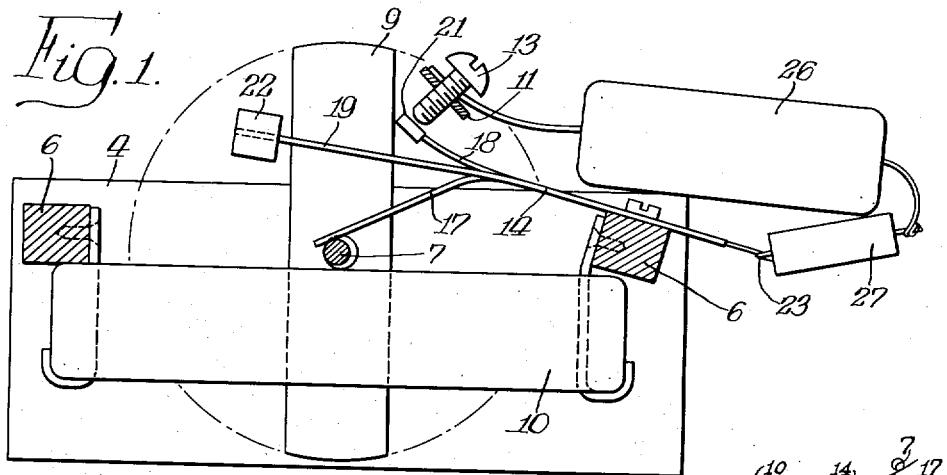
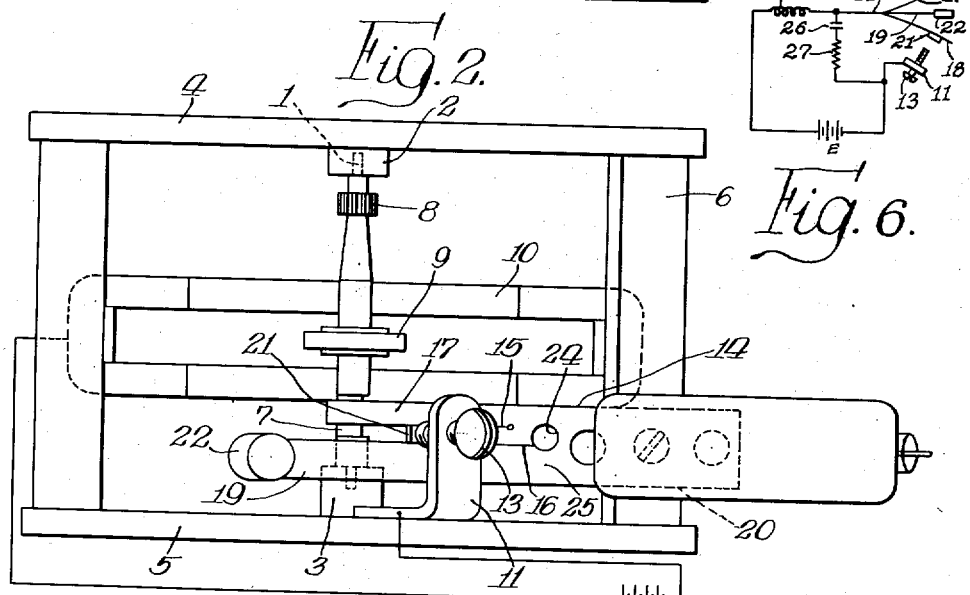
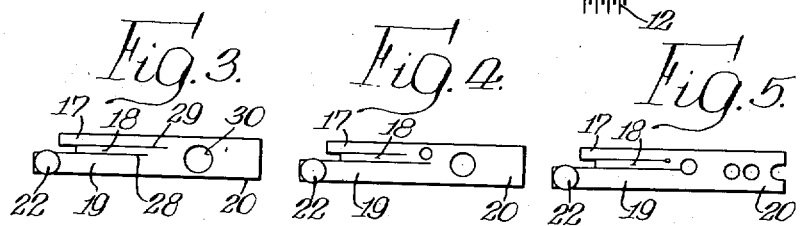
INVENTOR.
James M. Vanderleck
BY Brown, Jackson,
Boettcher & Dienner
Attys.

Patented Sept. 18, 1951

2,568,100

UNITED STATES PATENT OFFICE 2,568,100

VIBRATING REED TYPE DIRECT-CURRENT MOTOR

James M. Vanderleck, Toronto, Ontario, Canada, assignor to Sangamo Electric Company, Springfield, Ill., a corporation of Illinois Application August 20, 1949, Serial No. 111,550
In Canada May 28, 1949

14 Claims. (Cl. 172—36)

1

This invention relates to improvements in electric motors and more particularly to the vibrating reed "hit-and-miss" type motors which are frequently used as control or timing apparatus.

The principal object of the invention is to provide a novel and very simple reed-governed direct current motor mechanism which will operate at an extremely constant speed and which will be substantially unaffected by shock or changes of position, eliminating hunting and also other undesirable motor actions exhibited by present vibrating reed type motors when subjected to shock or positional changes.

A further object of the invention is to provide a novel reed governor construction which will enable the motor characteristic to be accurately predetermined in accordance with the desired function of the motor which may require an operating characteristic varying from maximum starting efficiency to maximum regulation of the speed of the motor.

A still further object is to provide a motor of the type described which will be extremely dependable and of very inexpensive as well as simple construction.

The principal feature of the invention consists in providing a novel vibrating reed governor for a "hit-and-miss" type motor, the reed device comprising a spring metal strip formed into three semi-separated resilient arms or cantilevers extending from a common base and forming respectively a rotor-engaging cam follower arm, a contact carrying arm for controlling the energization of the motor field circuit and a weighted arm forming a vibration control element having a natural period of vibration, the coupling between the cam follower arm and contact arm and the weighted arm and the contact arm being predeterminable through the cutting of said reed to form said arms to control the motor characteristics, ease of starting and constancy of speed in operation.

A further important feature of the invention consists in modifying the coupling between the arms to provide a desired motor action by slotting or perforating the common base connecting the arms to provide different strip cross sections throughout the base.

Referring to the accompanying drawings, Figure 1 is an enlarged vertical sectional view taken through a "hit-and-miss" type motor employing a reed governor device constructed in accordance with my invention.

Figure 2 is a plan view of the motor of Figure 1.

2

Figure 3 is a plan view of a modified form of a reed governor device embodying my invention.

Figure 4 is a further modified governing reed having different coupling between the semi-separated arms.

Figure 5 is a plan view of a still further modified reed control.

Figure 6 is a circuit diagram for the said motor.

There are many applications where a small battery-operated motor having a constant speed output is desirable. In particular, such a constant speed direct current motor may be used in controlling the relay of information, as for example in relaying information concerning atmospheric conditions from a weather balloon.

It is therefore highly desirable that the motor be of inexpensive construction, but, on the other hand, it must be dependable and must have a high degree of constancy of speed to convey intelligent information or to perform any other function successfully.

At the present time there are several relatively inexpensive direct current battery-operated motors which are used as governors and which are known as "hit-and-miss" type motors.

Motors of this class comprise essentially a rotor actuated by a field which is intermittently energized by means of a contact mechanism operated by the rotation of the rotor to start the motor and operated by a vibrating reed to control the motor speed in operation.

Heretofore the vibrating reed and the rotor-actuated contact operating part have been rigidly coupled so that a compromise between ease of starting and constancy of speed regulation was not possible, and to enable the motor to start, the function of the vibrating reed as a governing element is partially nullified and the reed permits the motor to hunt between fairly wide speed limits.

In its commonest form the vibrating reed is a resilient arm carrying a weight at its outer end and this weighted arm is closely coupled to the contact mechanism whereby the weight serves to prevent proper operation of the contact mechanism, and where the motor is in an inverted or incorrect position the weight acts to maintain the contact mechanism closed independent of any action that the initial movement of the rotor may have to prevent the motor from starting.

In addition to the position sensitivity of the motor with present reed governors, such present motors are also sensitive to shock which may stop the motor or incur other improper motor actions.

The present invention completely overcomes the above difficulties and it is a specific object of the invention to provide a reed governor which will be sensitive to neither position nor shock and which will enable a compromise between ease of starting and constancy of speed of the motor to be realized, eliminating hunting and other unreliable motor actions.

Referring to the drawings, I show a spindle 1 rotating in bearings 2 and 3 provided at each of the frame sides 4 and 5 separated by the transverse bars 6. A portion of the spindle 1 adjacent the frame side 5 is turned to provide an offset or eccentric cam portion 7. Adjacent the opposite frame side 4 the spindle is turned down to provide the pinion 8 which may be arranged to mesh with any apparatus to be controlled.

Mounted on the spindle intermediate the cam portion 7 and the pinion 8 is a rotor element 9 in the form of a magnetized bar.

Secured to the transverse bars 6 below the spindle 1 is an elongated coil 10 which forms the motor field.

In the motor illustrated each of the frame sides 4 and 5 is of an insulating material and mounted on the frame side 5 is bracket 11 connected to one side of a battery 12, while the opposite pole of the battery is connected to one end of the coil 10.

Secured in this bracket 11 is a contact screw 13 forming an adjustable contact.

The means for energizing the motor field 10 and for controlling the frequency of energization of the motor field and hence the motor speed, comprises the governing reed device generally designated at 14. This device is formed of a strip of spring metal which is cut along the lines 15 and 16 longitudinally inwardly from one end as shown in Figure 2 to provide the semi-separated arms or cantilevers 17, 18 and 19, all having a common base 20 secured to one of the transverse frame bars 6.

By "semi-separated" it will be appreciated that I mean the arms 17, 18 and 19 extend separately but are in effect mutually coupled through their common bases to provide mutual interaction therebetween in accordance with their coupling. As will appear hereinafter, the degree of coupling between the arms is determined by the relative rigidity of the common base adjacent the terminating portion of the respective arms. Accordingly, by altering the relative rigidity by deforming the base at critical points, the degree of coupling between the relative arms may be correspondingly varied. The relative base deformations may be accomplished by grooving, perforations, slots, etc.

One of these arms 17 is bent downwardly to resiliently engage the offset or eccentric cam portion 7 of the spindle 1 to form a cam follower. A second arm 18 is provided with a contact 21 to co-operate with the adjustable contact 13.

The third and longest arm 19 carries a weight 22 at its outward end to form a vibratory control element, which I may term the governing reed or element.

Connecting the governing reed device 14 with the motor field is the lead 23 so that the field circuit is completed through the lead 23 and contacts 13 and 21 when these contacts are made.

In the starting action of the motor, when the rotor is turned so that the cam portion 7 of the spindle displaces the cam following arm 17 upwardly, contact 21 carried by the contact arm 18 will be forced into engagement with the contact screw 13 and the field circuit of the motor energized.

This energization of the field will impart a rotative motion to the rotor to turn same to align with the field. This turning motion of the rotor will rotate the spindle cam portion 7 and the cam follower 17 will move downwardly, breaking contact between the contacts 13 and 21 to de-energize the motor field.

Due to its own angular momentum the rotor will continue to rotate until the cam follower 17 is again elevated to close the contacts 13 and 21 and the motor field will be re-energized and the cycle repeated.

It will be appreciated that the motor action will be such that the motor will pick up speed and if no control were provided this speed would be dependent only on the friction of the bearings, the resistance offered to the rotor and the condition and action of the contacts to provide a very unstable motor action having no speed regulation.

As the motor picks up speed the vibrating motion imparted to the governor device 14 through the cam follower 17 will cause the vibrating control element 19 to commence vibrating. This control element 19 has a natural period of vibration corresponding to its length and the mass of the weight 22, and its mode of vibration for any amplitude of vibration will be its fundamental or natural frequency. Thus as the motor speeds up and more energy is delivered to the vibrating control element 19 its vibration will be such as to swing with its own natural period.

The energy imparted to the governing device 14 upon any action of the motor to increase its speed will result in only increased amplitude of vibration of the control element 19 without changing its frequency or periodicity.

As the amplitude of the element 19 increases it assumes control of the contact arm 17 coupled therewith, so that this contact arm will be actuated in a manner to conform to the movements of the governing element 19 whereby the contacts 13 and 21 will be made and broken with a periodicity corresponding to the periodicity of the natural period of the control element.

Thus as the motor assumes its speed the cam follower 17 loses control and the large amplitude vibration of the control element 19 takes over control to govern and regulate the motor speed to maintain the speeds substantially constant.

It will be appreciated that the actual control of the contact arm 18 depends on the degree of coupling between the cam follower 17 and the contact arm and between the vibrating control element 19 and the contact arm.

It will be appreciated in the extreme cases where no coupling was provided between the cam follower and the contact arm the motor would not start but if it once attained speed and close coupling were provided with the control element 19, the speed of the motor would be perfectly governed.

On the other hand, should there be no coupling between the control element 19 and the contact arm and a high degree or close coupling between the cam follower and contact arm, the motor would start perfectly but would have no speed regulation.

With my method of forming these contact cam follower and control arms by means of the cuts 15 and 16 I provide a compromise between coupling for maximum starting facility and maximum governor efficiency.

In Figure 2 it will be seen that the common base 20 of the governing reed device is perforated or slotted at 24. These perforations or slots alter the cross section of the base of the spring strip forming the governing reed device to modify the coupling between the arms 17, 18 and 19.

In Figure 2 it will be seen that the cam follower 17 and contact arm 18 are quite closely coupled, whereas the cut 16 defining the governing reed or control element 19 intersects the perforation 24, reducing the coupling between the contact arm and cam follower and the governing reed to a minimum, vibrations being imparted only through the relatively small cross section 25.

It will be appreciated that any degree of coupling can be provided between these arms with various modifications of coupling illustrated in Figures 3, 4 and 5.

To prevent arcing between the contacts 13 and 21 a suitable condenser 26 and resistor 27 are connected therebetween so that the governor device can operated quietly and efficiently to provide a long life action.

In the modification of Figure 3 it will be seen that the coupling between the governing reed element or control arm 19 and the contact arm 18 is quite close as formed by the relatively short cut 28 defining these arms.

The cam follower 17 is formed by a relatively longer cut 29 which, together with the orifice 30, provides a relatively small coupling between this cam follower arm and the contact arm 18.

In Figure 4 on the other hand a greater degree of coupling is provided between the cam follower and the contact arm than the vibrating control arm and the contact arm, and in Figure 5 still less coupling is provided between the control element or arm and the contact arm illustrating the variable coupling effects that may be obtained.

While perforating or slotting the base forms a convenient way of changing the cross section of the base and hence the amount of energy that can be transferred from one arm to the other, it will be appreciated that other means of altering the base cross section may be resorted to without departing from the scope of my invention, such means including grooving, cutting or otherwise deforming the base 20.

It will be appreciated that since the weighted arm 19, which forms the actual control element or reed, is not tightly coupled to the contact arm 18 the position of the device and hence the position of the weight 22 will not impair the proper motor operation. Further, since the cam follower 17 is not connected rigidly or directly with the weighted arm 19, movement of this cam follower under rotation of the rotor will not materially affect the weighted arm to alter its normal period of vibration, a serious disadvantage occurring in present hit-and-miss type motors.

It will be further understood that the desired motor action can be predetermined and the desired compromise chosen at will between maximum coupling of the arms for starting and maximum coupling for governing. As my governing device 14 is formed from a single piece of spring metal it can be very cheaply and economically manufactured and there will be no complicated or moving parts to get out of adjustment or to require an assembly operation.

What I claim as my invention is:

1. In a vibrating reed type direct current motor, the combination with a motor structure having a rotor, a cam rotated by said rotor and a field winding to impart rotative motion to said rotor, means for energizing the field from a direct current source at predetermined intervals having a substantially constant periodicity to provide a self-regulating motor having a substantially constant speed independent of variations in motor operating conditions, said means comprising a spring arm cut longitudinally from one end to provide three mutually coupled cantilever strips connected through common bases, one of said strips forming a cam follower resiliently engaging said cam, another of said strips being weighted to form a vibration control element having a predeterminable natural vibration period, the third of said strips forming a contact arm movable to make and break current flow to said field, said cam follower being operative to effect movement of said contact arm through and in accordance with the degree of relative rigidity of said mutual coupling to start the motor, said vibration control element being effective to transmit forces through said common base to said contact arm to control the speed of operation of the motor in accordance with the periodicity of said vibration control element.

2. In a vibrating reed type direct current motor, the combination with a motor structure having a magnetized rotor, a cam rotated by said rotor and a field winding offset from the axis of said rotor and arranged to impart rotative motion to said rotor, of means to energize the field from a direct current source at predetermined intervals having a substantially constant periodicity, said means comprising a spring arm cut longitudinally from one end to form three cantilever strips connected to a common base and mutually coupled through the common portions of said base, one of said strips forming a cam follower resiliently engaging said cam, another of said strips being weighted at its free end to form a vibration control element having a natural vibration period, the third of said strips forming a control arm movable to make and break current flow to said field, said control arm being operatively controlled in its movements by said cam follower and said vibration control element through the medium of said coupling base, said cam follower being operative with actuation thereof to initiate movement of said control arm through said mutual base, and said vibration control element being operative to control speed of operation of said control arm in accordance with the periodicity of said vibration control element after said periodicity is reached.

3. A device as claimed in claim 2 in which said base is perforated to modify the degree of mutual coupling between said cantilever strips and the response of the control arm to the movements of the cam follower and the vibration control element, the speed of operation of the control arm being determined by the periodicity of the vibration control element and the relative rigidity of the coupling portions of their common base.

4. In a vibrating reed type direct current motor, the combination with a motor structure having a rotor formed with a cam surface and a field winding connected to one terminal of the direct current source and an insulated contact connected to the other terminal of the D.-C. source, of a reed in electrical connection with said field and cut to provide three cantilever sections connected to a common base and having mutual inter-coupling, the degree of coupling being determined by the relative rigidity between the common base portions of the sections, said cantilever sections forming respectively a cam follower resiliently engaging said rotor cam surface, a contact arm coupled with said cam follower and movable into and out of contact with said insulating contact in accordance with the movements of said cam follower and the relative degree of coupling therewith, and an arm carrying a weight adjacent the end thereof and forming a vibration control element having a predeterminable periodicity and controlling the movement of said contact arm at a given speed in accordance with the degree of rigid periodicity and its coupling between said contact arm and said vibration control element.

5. In a vibrating reed type direct current "hit-and-miss" motor, a motor structure having a rotor provided with an offset cam surface and a field winding to effect rotation of said rotor upon intermittent energization, of a vibrating reed device to energize the field from a direct current source, said vibrating reed device comprising a spring arm anchored at one end and cut longitudinally inwardly from the other free end to form three semi-separated cantilever strips, one of said strips forming a cam follower resiliently engaging said cam surface, another of said strips being weighted to form a vibrating control element having a predeterminable vibration period and the other of said strips forming a contact arm movable under the influence of said cam follower and vibrating control element to make and break current flow to said field, said strips being mutually coupled by said base portion, the degree of coupling being determined by the relative rigidity of the common base portions which extend from the point of termination of the arms, said cam follower having a first predetermined degree of coupling to said contact arm to control movement of same in the starting of the motor and said vibrating control element having a second predetermined degree of coupling to said control arm to control movement of same to operate said motor at a substantially predetermined constant speed with operation of the vibrating arm at its predetermined periodicity.

6. In a vibrating reed type direct current "hit-and-miss" motor, the combination with a motor structure having a rotor provided with an offset cam surface and a field winding to effect rotation of said rotor upon intermittent energization, of a vibrating reed device to energize the field from a direct current source, said vibrating reed device comprising a spring arm anchored at one end and cut longitudinally inwardly from the outer free end to form three semi-separated cantilever strips mutually coupled through a common base the common base being perforated to modify the degree of rigid coupling between said strips in accordance with the desired motor operating conditions, one of said strips forming a cam follower resiliently engaging said cam surface, another of said strips being weighted to form a vibrating control element having a predeterminable vibration period, and the other of said strips forming a contact arm movable under the influence of said cam follower and vibrating control element to make and break current flow to said field, said cam follower being coupled to said vibration control element with sufficient rigidity to effect movement thereof to start operation of the contact arm and the motor, said vibrating control element being coupled to said contact arm to control the speed of operation thereof and the motor at a predetermined speed with arrival at its natural periodic state, said controlled speed value being determined by the periodicity of the vibration control element and the degree of rigid coupling between the contact and the vibration control element's arms with said contact arm enabling the motor to be started and to be operated self-regulated as to speed.

7. A device as claimed in claim 6 in which various cuttings and perforations of said vibrating reed device enables the degree of coupling between said cantilever strips to be varied between predetermined values of maximum coupling between said cam follower and said contact arm for optimum starting conditions and maximum coupling between said vibrating control element and said contact arm for optimum speed regulation.

8. In a vibrating reed type direct current motor, the combination with a motor structure having a rotor, a cam rotated with said rotor, and a field to rotate said rotor upon intermittent energization, of a vibrating reed device comprising a spring metal strip secured at one end and slit longitudinally inwardly from the other end to provide a contact arm for energizing said field, a cam follower arm, and a vibratory control arm carrying a weight at the other end said one end forming a common base for the several arms for transmitting operating forces therebetween, operation of the cam follower being thus effective through said base transmitted forces to initiate corresponding movements of the contact arm and the vibratory control arm, the force transmission by the common base being determined by the relative rigidity of and between the base portions of the respective arms as determined by the length of the inwardly extending slits.

9. A device as claimed in claim 8 in which said spring metal strip is formed with areas of reduced cross section adjacent the secured end to modify coupling between said arms.

10. A reed device for "hit-and-miss" type direct current motors which is operatively responsive to a cam actuating member caused by the rotor shaft on said motor, comprising a spring metal strip cut longitudinally inwardly from one end to provide three semi-separated arms, one of said arms carrying a weight adjacent the outer end and a second of said arms having a contact portion adjacent its outer end, the third of said arms being arranged for operative movement by the cam actuating member.

11. A reed device as claimed in claim 10 in which the cross section of said strip is reduced throughout areas at the inner ends of said arms to vary the degree of relative rigidity and the coupling between said three arms.

12. A reed device as claimed in claim 10 in which the weighted arm is the longest of said arms and the contact arms the shortest of said arms.

13. In a vibrating reed type direct current motor, the combination with a motor structure having a rotor, a cam rotated by said rotor, and a field winding to impart rotative motion to said rotor, of means to energize the field from a direct current source at predetermined intervals having a substantially constant periodicity to provide a self-regulated motor having a substantially constant speed independent of variations in motor operating conditions, said means comprising a spring arm formed to provide three semi-separated mutually coupled cantilever arms one of said cantilever arms being arranged to resiliently contact said cam forming a cam follower, another of said cantilever arms forming a contact arm movable to make and break current flow to said field, the third cantilever arm carrying a weight and forming a vibration control element having a predetermined substantially constant periodicity of vibration, said cam follower and said contact arm being mechanically coupled through said common base, a predetermined degree of coupling between said members being effected by the provision of a base of a predetermined rigidity at the coupling point therefor, said coupling base being thus operative responsive to the forces transmitted by said cam follower with movement thereof to transmit said forces to said control arm to initiate the operation thereof and to start the oscillation of the vibration control element, said base coupling being operative to transfer the forces received from said vibration control element thereafter to said contact arm to effect the operation of said contact arm at a speed which is determined by said constant periodicity of vibration and the degree of rigid coupling between the contact arm and said vibration control element.

14. A device as claimed in claim 13 in which the coupling between said vibration control element and said contact arm is greater than the coupling between said cam follower and contact arm.

JAMES M. VANDERLECK.

REFERENCES CITED

The following references are of record in the file of this patent:

UNITED STATES PATENTS

| Number | Name | Date |
|---|---|---|
| 2,266,037 | Henninger et al. | Dec. 16, 1941 |
| 2,483,086 | Coake | Sept. 27, 1949 |

Certificate of Correction

Patent No. 2,568,100 September 18, 1951

JAMES M. VANDERLECK

It is hereby certified that error appears in the printed specification of the above numbered patent requiring correction as follows:

Column 7, line 12, strike out "the degree of rigid" and insert instead *its*; line 13, strike out "its" and insert instead *the degree of rigid*; and that the said Letters Patent should be read as corrected above, so that the same may conform to the record of the case in the Patent Office.

Signed and sealed this 1st day of January, A. D. 1952.

[SEAL]

THOMAS F. MURPHY,
*Assistant Commissioner of Patents.*